June 7, 1960     H. J. LEONARD ET AL     2,939,440
ACCESSORY DRIVE ENGINE

Filed Sept. 10, 1958     7 Sheets-Sheet 1

INVENTORS
*Henry J. Leonard*
BY *& George J. Watt*
*L. D. Burch*
ATTORNEY

Fig. 8

INVENTORS
Henry J. Leonard
BY & George J. Watt
ATTORNEY

United States Patent Office
2,939,440
Patented June 7, 1960

2,939,440

ACCESSORY DRIVE ENGINE

Henry J. Leonard, Detroit, and George J. Watt, Birmingham, Mich., assignors to General Motors Corporation, Detroit, Mich., a corporation of Delaware Filed Sept. 10, 1958, Ser. No. 760,157

9 Claims. (Cl. 123—41.72)

This invention relates to internal combustion engines applicable for generating power, and especially applicable as auxiliary drive units for driving the pumps, generators, blowers, condensing units, etc., utilized in the operation of motor vehicles.

It is now customary to drive the various accessories associated with motor vehicles from the engine employed in operating the motor vehicle. However, it is expensive to provide separate drives and mountings for the accessories and the construction of these accessories as separately mounted and driven units takes up more space than is desirable. Actually, an engine compartment in a motor vehicle has become so filled with various accessory devices and the drives and mountings therefor that it is almost impossible to service the engine. Also the engine employed in operating a motor vehicle does not operate at all times at the most efficient speeds for operating the accessories. It is therefore customary to employ various kinds of devices for wasting the power of the engine so that the accessory devices may be driven in some acceptable manner, although far from the most efficient manner.

It is now proposed to provide an accessory drive unit for driving all of the accessory devices that are required or that may be desirable in operating a motor vehicle and to construct this unit in such a way that all of these devices will be most efficiently and economically driven. The accessory drive engine also provides for mounting and operating these devices without excessive space requirements and mounting mechanism, such as belts, pulleys, clutches, etc.

In the drawings:

Figure 7 is a fragmentary view of the engine illustrating the cooling liquid circulating pump employed in the engine. Figure 7 is taken substantially in the plane of line 7—7 on Figure 1 looking in the direction of the arrows thereon.

The engine 10 embraces an engine frame 11 formed by crankcase members 12 and 13 and an end closure member 14. The crankcase members 12 and 13 are secured together by bolts 16 and 17, the end closure member 14 being secured to the two crankcase members by bolts 18. Cylinder units 19 and 21 embrace cylinders 20 and cooling liquid jackets 22 which are formed integrally with the crankcase members 12 and 13, respectively. The cylinders 20 of the cylinder units 19 and 21 are formed to provide open ends 25 communicating with the crankcase 23 formed by the crankcase members 12 and 13 and closed ends 30 projecting in opposite directions from the crankcase members 12 and 13. The jacket means 22 is spaced outwardly of the cylinders 19 and 21 to provide the cooling liquid cavity means indicated at 24. The outer closed ends 30 of the cylinders 20 embrace inlet passages 26 and exhaust passages 27 adapted to be controlled by inlet valves 28 and exhaust valves 29, mounted in valve guide means 93 formed in the walls forming the passages 26 and 27 and in the jacket means 22. The jacket means 22 is open at one side and at the outer closed end of each of the cylinders 20, the openings at the sides being closed by side closure means 32 and at the ends by end closure means 33. The passages 26 and 27 open outwardly through the jacket means 22 on one side of each of the cylinders 19 and 21, inwardly of the end closure means 33 and on opposite sides of the side closure means 32.

Figure 3:
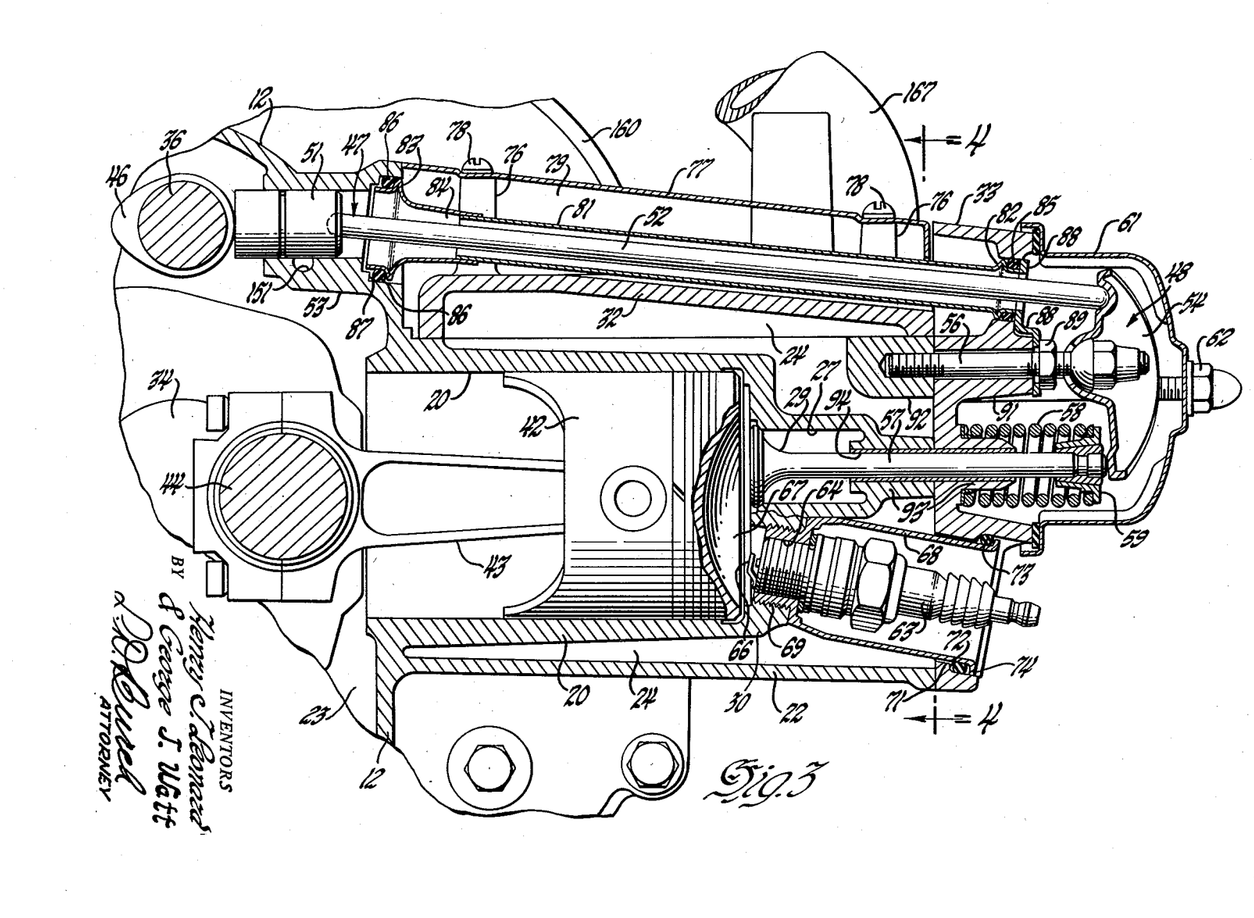
Figure 3 is an enlarged vertical sectional view of a part of the engine, particularly illustrating one of the cylinder units of the engine.
Figure 4:
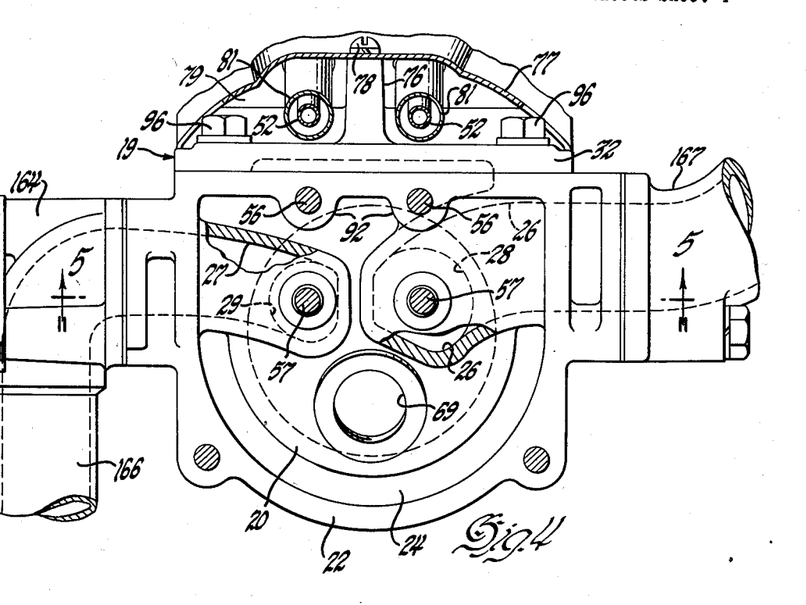
Figure 4 is a vertical cross sectional view of the cylinder unit of the engine illustrated by Figure 3 and taken substantially in the plane of line 4—4 on Figure 3.
Figure 5:
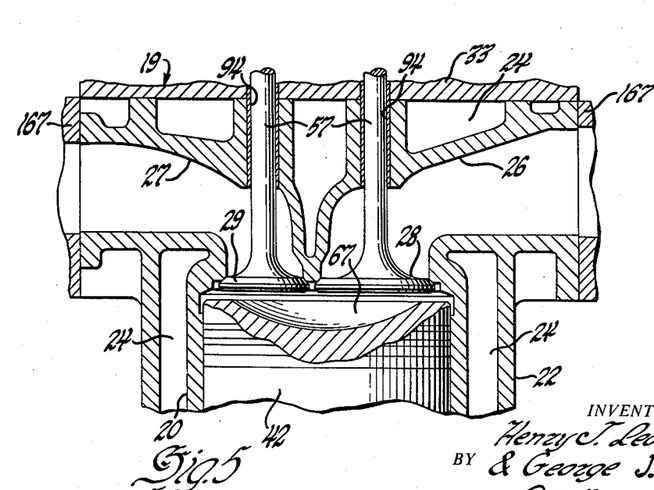
Figure 5 is a fragmentary horizontal sectional view taken through the outer end of the cylinder unit illustrated by Figures 3 and 4 and looking upwardly in the plane of line 5—5 on Figure 4.
Figure 6:
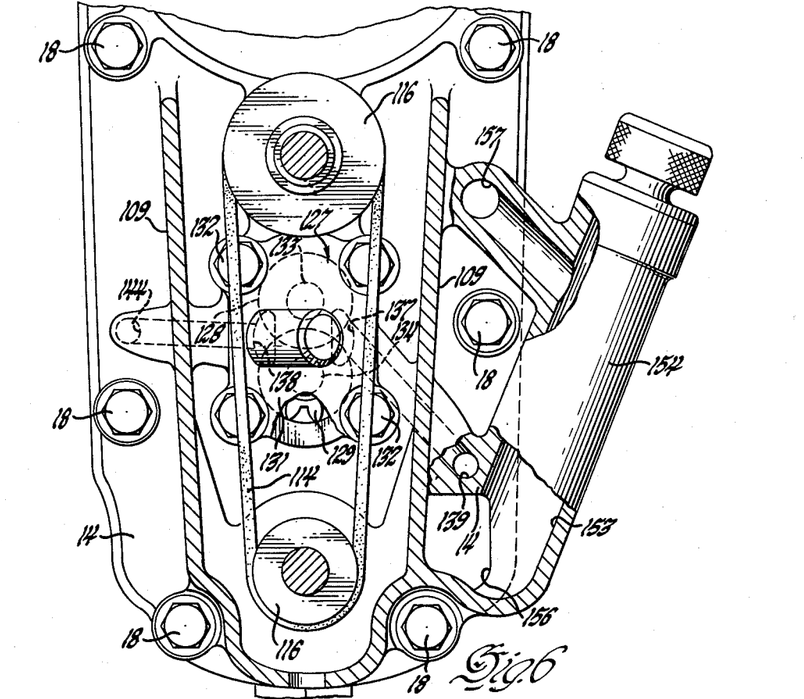
Figure 6 is a fragmentary vertical sectional view at the end of the engine illustrated by Figure 2 and taken substantially in the plane of line 6—6 on Figure 1.
Figure 7:
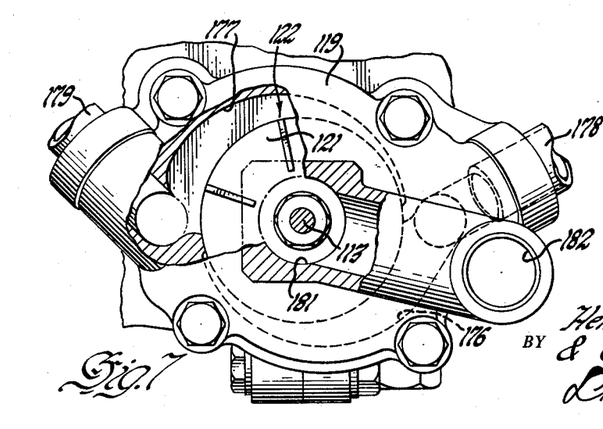

It will be apparent from the construction shown that it will be possible to die cast the various parts of the engine, particularly the parts 11, 13, 14, 19, 21, 32 and 33. It will be possible to cast the cooling liquid cavities 24 within the cylinder units 19 and 21 by reason of the side closure means 32 and end closure means 33, and the fact that the passages 26 and 27 open outwardly on one side of each cylinder member and through the jacket means 22. It will be apparent that one core may be removed axially of the cylinder to form the cavity means on the lower side of the cylinder, while the other core may be removed laterally on the side of the cylinder in which the inlet and exhaust passages are formed. The core forming the lower part of the cooling cavity may be withdrawn through the opening closed by the closure means 33 while the core forming the upper part of the cavity means may be withdrawn through the opening closed by the closure means 32. The cavities are formed by surfaces sloping in opposite directions from the surfaces to be formed by the various cores and diverging or converging outwardly through the openings through which the cores may be removed. The surfaces elsewhere on the various parts are also formed to slope outwardly in a similar manner in one direction at any place where an interior or exterior surface is to be formed.

Figure 1:
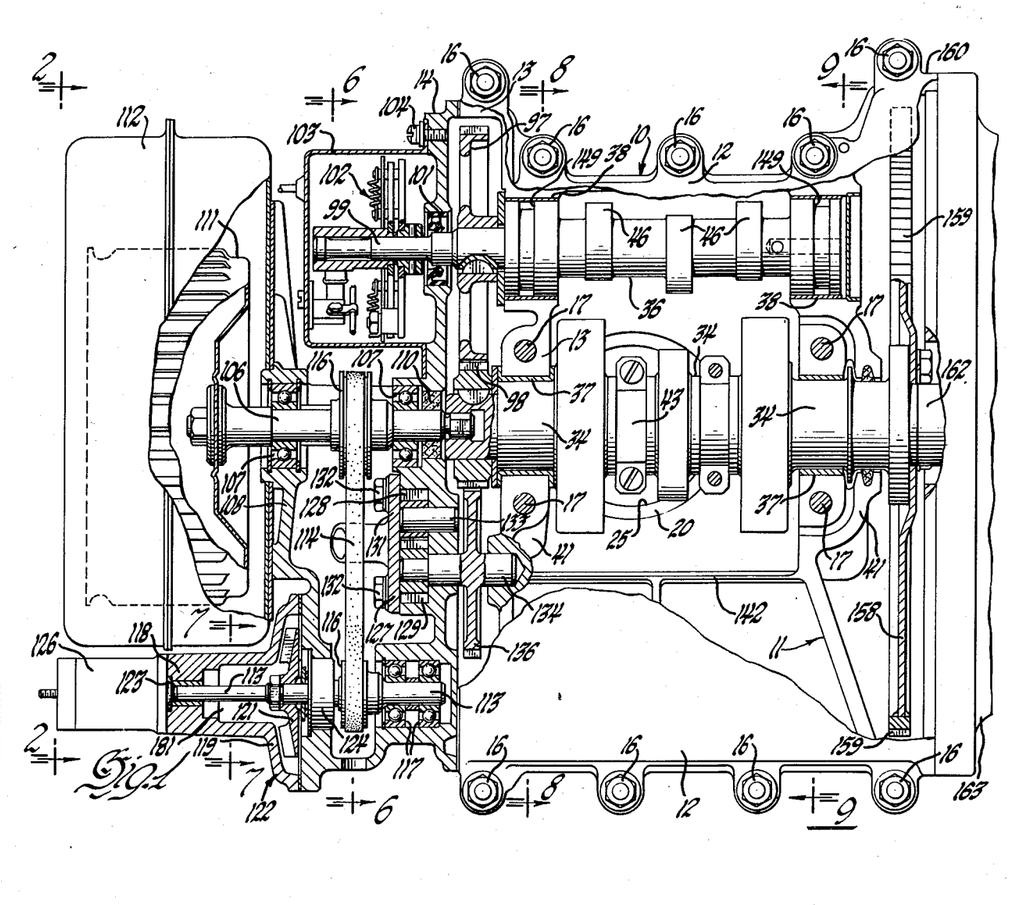
Figure 1 is a side elevational view of an internal combustion engine embracing the features of the invention, the structure being broken away in various places and illustrated in cross section to better disclose the various novel features of the engine.
Figure 8:
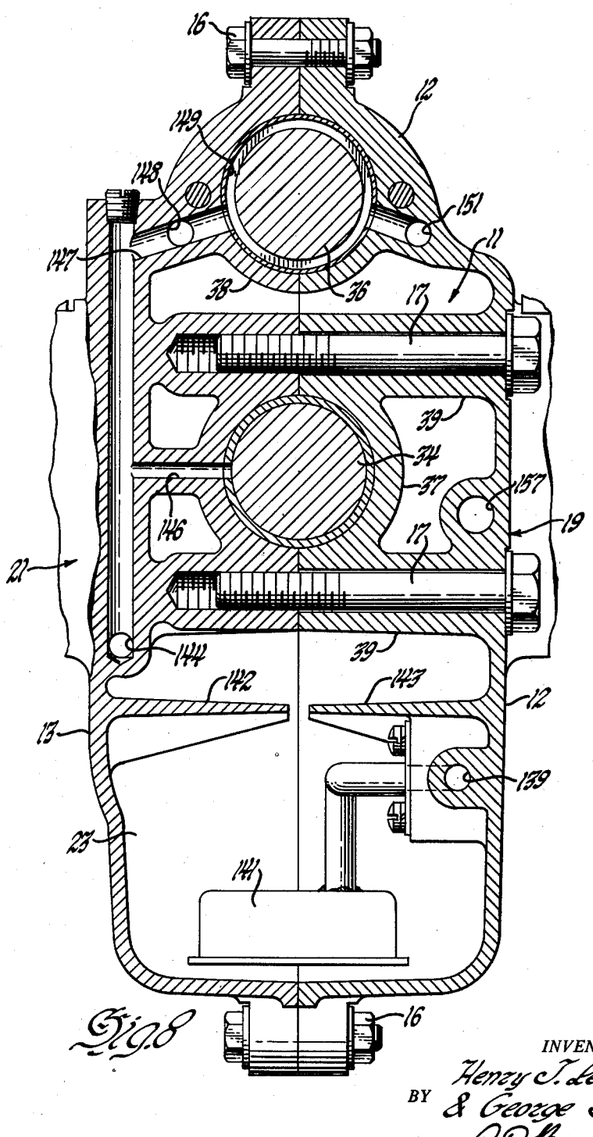
Figure 8 is a vertical sectional view through the interior of the engine, taken substantially in the plane of line 8—8 on Figure 1 and looking in the direction of the arrows thereon.
Figure 9:
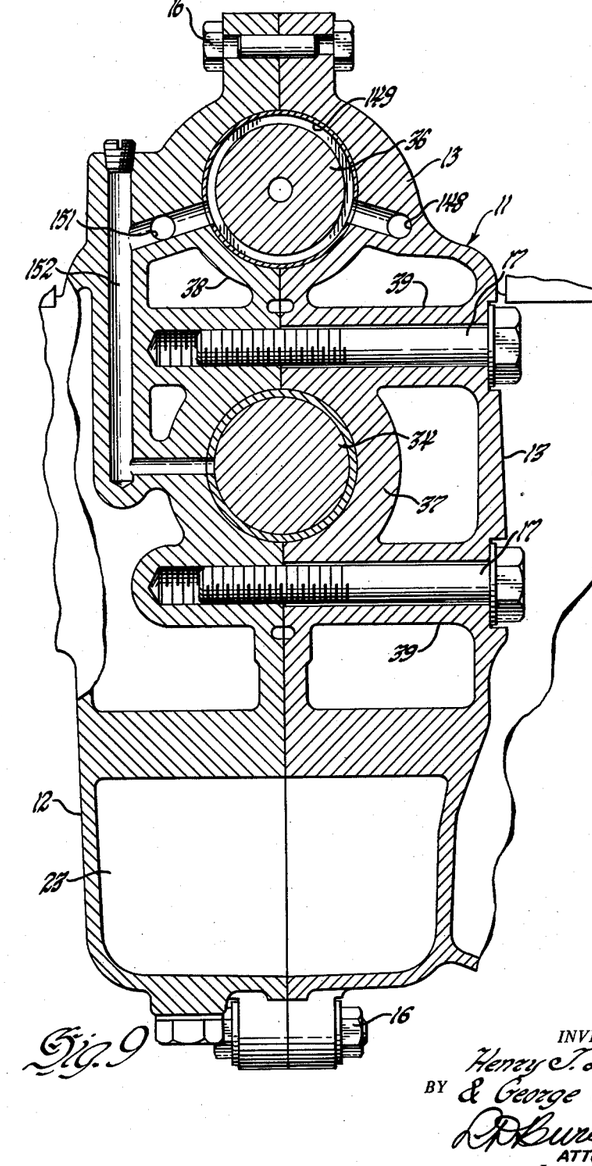
Figure 9 is another vertical sectional view through the interior of the engine, taken substantially in the plane of line 9—9 on Figure 1 and looking in the direction of the arrows thereon.

The upper part of the crankcase 23 of the engine is adapted to contain the camshaft 36 and the crankshaft 34, the camshaft being located above the crankshaft and above where the cylinders 20 communicate with the crankcase members 12 and 13. Bearings 37 for the crankshaft 34 are formed in oppositely disposed halves in the crankcase members 12 and 13. Bearings 38 for the camshaft 36 are also formed in the members 12 and 13 in similar halves. The bolts 17 extend through bosses 39 on opposite sides of the bearings 37 for securing the bearing halves together. The bosses 39 are formed to extend alternately between opposite side walls of the crankcase members 12 and 13 for the different bearings 37. The bolts 17 also extend through the bosses 39 from opposite side walls for alternate bearings. The bearings 37 and 38 are formed in inwardly disposed supports 41 that extend across the crankcase members 12 and 13 adjacent the opposite ends of the crankshaft 34 and the camshaft 36.

The crankshaft drives pistons 42 in the oppositely disposed cylinders 20 by means of connecting rods 43 connecting the pistons to oppositely disposed crankarms 44 of the crankshaft 34. The camshaft 36 has cams 46 which drive push rod means 47 for operating valve mechanisms 48 associated with the inlet and exhaust valves 28 and 29, respectively. The push rod means 47 may embrace valve lifters 51 and push rods 52, the valve lifters being mounted in bosses 53 formed in the crankcase members 12 and 13. The push rods 52 extend from the valve lifters 51 to the rocker arms 54. The rocker arms 54 are supported by studs 56 secured in the jacket means 22. The ends of the rocker arms 54 opposite the push rods 52 engage the outer ends of the stems 57 of the valves 28 and 29, the stems being held in valve closing position by valve springs 58 compressed between spring washers 59 and the closure means 33. Valve mechanism covers 61 may be secured by studs 62 over the valve actuating mechanism 48 at the outer ends of the cylinder units 19 and 21. Spark plugs 63 may be threaded in openings 64 in such a way that the ignition terminals 66 of the spark plugs will be disposed in combustion chambers 67 for the cylinders 20. The combustion chambers 67 may be formed between the pistons 42, the cylinders, the valves 28 and 29 and the spark plugs 63. The spark plugs 63 are adapted to be secured in the cylinders in container 68 having threaded ends 69 adapted to be secured in openings in the cylinder ends 30. The containers 68 extend through the cooling liquid cavities 24 from the jacket means 22 to the cylinder ends 30. The closure means 33 is provided with openings 71 through which containers 68 may be projected. The openings 71 embrace annular shoulders 72 adapted to locate O-rings 73 confined by flanges 74 formed at the outer ends of the containers 68. The O-rings 73 permit movement to compensate for the expansion and contraction which may result from variations in temperature of the various parts of the engine.

The side closure means 32 has supports 76 projecting therefrom and to which a cover 77 is secured by screws 78. The opposite edges of the cover 77 engage the edges of the side closure means 32 to provide a passage 79 between the bosses 53 and a part of the end closure means 33 which projects beyond the jacket means 22. Tubes 81 flanged at the opposite ends as is indicated at 82 and 83 provide passages 84 receiving the push rods 52. Flanges 83 are adapted to engage O-rings 86 which seal the inner ends of the tubes 81 in openings in the bosses 53 communicating with the passages in which the valve lifters 51 are located. Seats or abutments 87 are formed between the openings and the passages for limiting the inward movement of the tubes 81. The opposite ends of the tubes 81 project into openings formed in the end closure means 33, the flanges 82 being adapted to engage O-rings 85 which seal the ends of the tubes within the openings. Brackets 88 have openings therein through which the push rods 52 project and around which the brackets engage the ends of the tubes 81 to limit the outward movement of the tubes 81. The brackets 88 are secured beneath heads 89 on the studs 56 which secure the brackets 88 against the ends of bosses 91 in which the studs 56 are secured. The studs 56 project through openings in the bosses 91 and into threaded openings in bosses 92 formed in the jacket means 22 surrounding the outer end of the cylinders 20. The studs 56 therefore not only support the rocker arms 54 and position and support the brackets 88, the studs 56 also secure the end closure means 33 rigidily to the side wall parts of the jacket means 22. The engaging surfaces of the parts so secured may also be secured together by any suitable cement such as epoxy resin, etc. The valve guide means 93 supporting the valve stems 57 are formed partly in the cylinder ends 30 and partly in the end closure means 33. However, valve guide sleeves 94 are adapted to be pressed into the openings in the valve guide means for the purpose of providing a good bearing surface for the stems 57 and to further secure the closure means 33 to the cylinders 20 and the jacket means 22. The side closure means 32 also may be secured to the jacket means 22 by similar cement and by studs 96.

The camshaft 36 for the engine 10 is adapted to be driven from the crankshaft 34 by gears 97 and 98 located respectively on the camshaft and the crankshaft between the end bearings 38 and 37 for the shafts, respectively, and the end closure member 14. The end closure member 14 has an opening formed therein directly opposite the end of the camshaft 36 and through which a camshaft extension 99 projects outwardly of the crankcase 23. A seal 101 prevents leakage through the opening and around the shaft extension 99. Secured on the outer end of the shaft extension is an ignition distributor 102 which is adapted to time the ignition of the engine 10. The distributor 102 may be enclosed in a casing 103 secured to the member 14 by screws 104. A shaft extension 106 also is provided for the crankshaft 34. The shaft extension 106 is supported by spaced bearings 107 located in openings in the end closure member 14 and in a support 108 having a middle part spaced from the end closure member 14 by a U-shaped web 109. A seal 110 is provided in the opening in the end closure member 14 to prevent leakage from the crankcase 23. The shaft extension 106 may be removably secured to the shaft 34 by an end of the shaft having flat surfaces thereon and which project into a complementary opening formed axially in the end of the shaft 34. The outer end of the shaft extension 106 beyond the support 108 is provided with a rotary blower 111 which may operate in a case 112 secured in any suitable manner to the support 108. The blower 111 may be employed in supplying air for various accessory purposes such as heating the motor vehicle with which the engine 10 may be employed and for the purpose of cooling the radiator in which the cooling liquid employed in the engine may be cooled. The shaft extension 106 also is adapted to drive a countershaft 113 by means of a belt 114 and pulleys 116 secured on the shafts. The countershaft is rotatably mounted in bearings 117 located in recesses formed in the lower part of the end closure member 14 and in a bearing 118 formed in a cover 119 for an impeller 121 mounted on the countershaft 113 and forming the rotating part of a cooling liquid pump 122 for the engine 10. The casing for the pump 122 is sealed against leakage by seals indicated at 123 and 124. The pump 122 has discharge chambers 176 and 177 which are separately connected by conduits 178 and 179 to the cooling cavity means 24 for the cylinder units 19 and 21. The pump also has an inlet 181 connected to the radiator for the engine 10 by a conduit 182. The outer end of the shaft 113 may be connected to the shaft of a tachometer generator indicated at 126, which is secured to the cover 119 beyond the end of the shaft 113.

The lubricating oil pump 127 for the engine 10 is formed by gears 128 and 129 mounted in a recess in the outer surface of the end closure member 14 and normally closed by a cover 131 secured to the end closure member 14 by bolts 132. The gear 128 may be mounted on a stud 133 secured in the end closure member 14 while the gear 129 is mounted on the end of a shaft 134 of a gear 136 secured in openings in the end closure member 14 and in the shaft support member 41. The gear 136 is driven by the gear 98 on the crankshaft 34. The pump has an inlet 137 and an outlet 138. The inlet 137 is connected by passage means 139 formed in the closure member 14 and the crankcase member 12 and leading to a pump screen inlet 141 mounted in the lower part of the crankcase 23. Lubricating oil in the lower part of the crankcase 23 is partially confined by a pair of baffles 142 and 143 located below the crankshaft 34 and extending toward the middle of the crankcase 23 from the side walls of the crankcase members 13 and 12, respectively. The inner edges of the baffles 142 and 143 are spaced to provide for restricted communication between the upper and lower parts of the crankcase 23. The outlet 138 is connected by passage means 144 formed in the closure member 14 and the crankcase member 13 to supply passages 146 and 147 leading to the bearings 37 and 38 for the ends of the shafts 34 and 36 which are located adjacent the end closure member 14. Outlet passage 147 communicates with a passage 148 extending along one side of the shaft 36 and from one bearing thereof to another. Each end of the passage 148 communicates with annular passages 149 formed in each of the journals for the bearings 38 for the camshaft 36. The crankcase member 12 has a passage 151 similar to passage 149 and communicating with the annular passages 149 in the journals for the bearings 38 for the camshaft 36. The passage 149 also communicates with a passage 152 formed in the crankcase member 12 and leading to the bearings 37 at the end of the crankshaft 34 opposite that at which the passage 146 communicates with the other bearing 37 for the crankshaft 34. The passages 146 and 152 are connected to opposite sides of the bearings 37 to communicate with the bearings on the sides thereof between the sides of the bearings where the unit loading is greatest. This means that the passages 146 and 152 communicate with the bearings on the pistons and connecting rod sides of the bearings.

The passages 148 and 151 also extend through the bosses 53 and intersect the openings in which the valve lifters 51 are mounted. The intersections of these openings lubricate and supply oil for operating the valve lifters 51 and provides oil that may leak in opposite directions in the openings for lubricating the cams 46 of the camshaft 36 and the push rods 52 and valve actuating mechanisms 48. The oil that leaks toward the push rods will flow downwardly through the tubes 81 and into the spaces within the covers 61 where it will be atomized by the movement of the parts for lubricating the springs 58, the valve stems 57, the rocker arms 54, etc.

The crankcase may be filled with oil through a passage 153 formed in a boss 154 projecting from one side of the end closure member 14. The lower part of the passage 153 communicates with the lower part of the crankcase 23 through an opening indicated at 156. Oil is returned to the crankcase through passage 153 and opening 156 from a passage means 157 formed in the end closure member 14 and in the crankcase members 12 and 13 and leading from the valve operating mechanisms 48 in the cover 61 for the cylinder units 19 and 21.

The opposite end of the crankshaft 34 may be provided with a flywheel 158 having a gear 159 at the outer periphery thereof and adapted to engage the pinion of an electric starter 161 secured to the crankcase member 13 at one side of a flywheel housing 160 formed on the crankcase members 12 and 13. Beyond the flywheel 158 the crankshaft 34 may be connected to the shaft 162 of a generator 163 or other accessory means which it may be desirable to employ in a motor vehicle.

Figure 2:
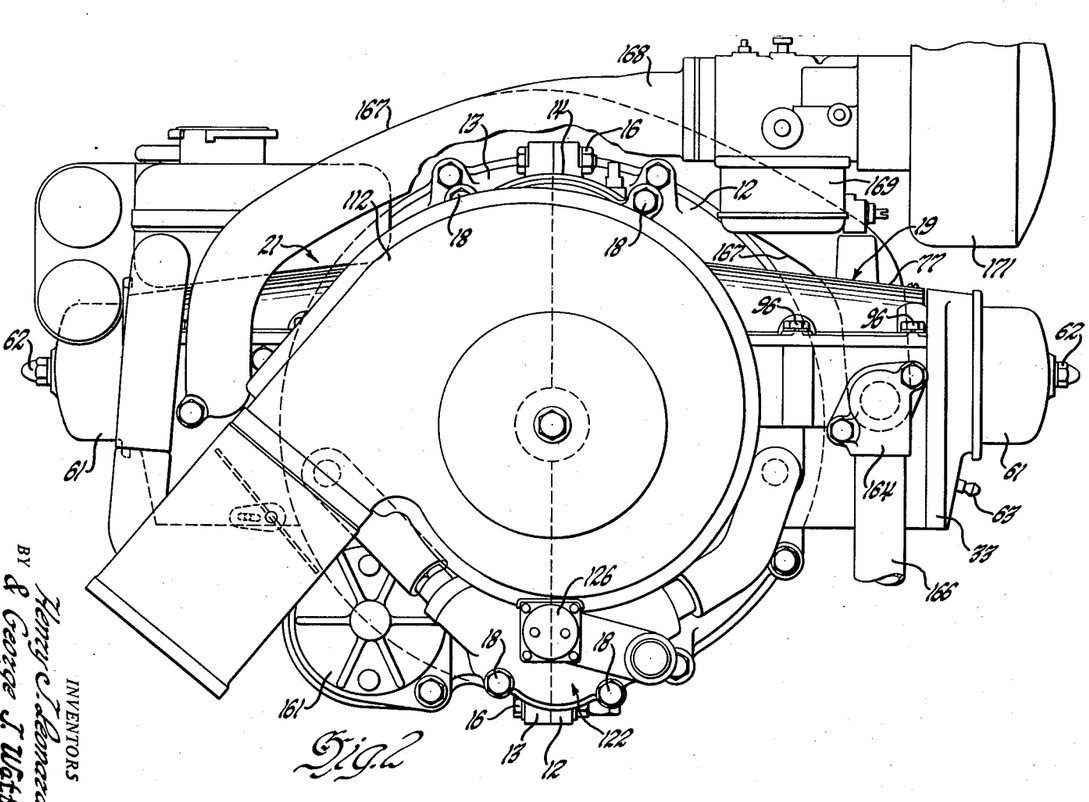
Figure 2 is an end view of the engine taken substantially in the plane of line 2—2 on Figure 1 looking in the direction of the arrows.

The exhaust passages 27 for the cylinder units 19 may be connected by couplings 164 to exhaust pipes 166. The inlet passages 26 for the cylinder units 19 and 21 may be connected to a manifold 167, the central part of which is formed at 168 to provide a supply passage connected to a carburetor 169. The carburetor may be supplied with air by a cleaner silencer unit indicated at 171.

We claim:

1. An engine having a crankcase member and a cylinder member, said cylinder member having an open end communicating with said crankcase member and a closed end opposite said crankcase member, inlet and exhaust passage means communicating with said cylinder member, cooling liquid jacket means associated with said members and being formed about and in spaced relation to said cylinder member and said closed end and said inlet and exhaust passage means, said jacket means being open at one side of said cylinder member, and removable closure means closing said jacket means at said one side of said jacket means and providing cooling liquid cavity means in said jacket means and surroundnig said cylinder member and said closed end and said passage means, said cooling liquid cavity means decreasing in cross sectional area from said one side of said jacket means in successive parallel planes and between said one side of said jacket means and the axis of said cylinder member, said cooling cavity means on said one side of said jacket means being formed by oppositely disposed surfaces sloping in opposite directions.

2. An engine having a crankcase member and a cylinder member, said cylinder member having an open end communicating with said crankcase member and a closed end opposite said crankcase member, inlet and exhaust passage means communicating with said cylinder member, cooling liquid jacket means associated with said members and being formed about and in spaced relations to said cylinder member and said closed end and said inlet and exhaust passage means, said jacket means being open at one end adjacent said closed end of said cylinder member, and removable closure means closing said one end of said jacket means and providing cooling liquid cavity means in said jacket means and surrounding said cylinder member and said closed end and said passage means, said cooling liquid cavity means on one side of said cylinder member decreasing in cross sectional area from said one end of said jacket means in successive parallel planes and between said one end of said jacket means and the opposite end of said jacket means, said cooling liquid cavity means on said one side of said cylinder members being formed by oppositely disposed surfaces sloping in opposite directions.

3. An engine having a crankcase member and a cylinder member, said cylinder member having an open end communicating with said crankcase member and a closed end opposite said crankcase member, inlet and exhaust passage means communicating with said cylinder member, cooling liquid jacket means associated with said members and being formed about and in spaced relation to said cylinder member and said closed end and said inlet and exhaust passage means, said jacket means being open beyond said closed end and at one side of said cylinder member, and removable closure means closing said jacket means beyond said closed end and at said one side of said jacket means and providing cooling liquid cavity means in said jacket means and surrounding said cylinder member and said closed end and said passage means.

4. An engine having a crankcase member and a cylinder member, said cylinder member having an open end communicating with said crankcase member and a closed end opposite said crankcase member, inlet and exhaust passage means communicating with said cylinder member, cooling liquid jacket means associated with said members and being formed about and in spaced relation to said cylinder member and said closed end and said inlet and exhaust passage means, said jacket means being open at one side of said cylinder member, removable closure means closing said jacket means at said one side of said jacket means and providing cooling liquid cavity means in said jacket means and surrounding said cylinder member and said closed end and said passage means, spaced supports projecting outwardly from said removable closure means, cover means secured on said supports in spaced relation to said closure means and providing a passage along one side of said cylinder member, valve means in said closed end of said cylinder member and controlling said inlet and exhaust passage means, valve actuating means supported by said jacket means and operatively associated with said valve means, a camshaft associated with said crankcase member, and push rods extending through said passage from said camshaft to said valve actuating means for actuating said valve means.

5. An engine having a crankcase member and a cylinder member, said cylinder member having an open end communicating with said crankcase member and a closed end opposite said crankcase member, inlet and exhaust passage means communicating with said cylinder member, cooling liquid jacket means associated with said members and being formed about and in spaced relation to said cylinder member and said closed end and said inlet and exhaust passage means, said jacket means being open at one end adjacent said closed end of said cylinder member, removable closure means closing said one end of said jacket means and providing cooling liquid cavity means in said jacket means and surrounding said cylinder member and said closed end and said passage means, valve means in said closed end of said cylinder member and controlling said inlet and exhaust passage means, and valve actuating means supported by said removable closure means and operatively associated with said valve means, said valve actuating means embodying studs engaging said removable closure means and securing said removable closure means to said jacket means adjacent said closed end of said cylinder means.

6. An engine having a crankcase member and a cylinder member, said cylinder member having an open end communicating with said crankcase member and a closed end opposite said crankcase member, inlet and exhaust passage means communicating with said cylinder member, cooling liquid jacket means associated with said members and being formed about and in spaced relation to said cylinder member and said closed end and said inlet and exhaust passage means, said jacket means being open at one end adjacent said closed end of said cylinder member, removable closure means closing said one end of said jacket means and providing cooling liquid cavity means in said jacket means and surrounding said cylinder member and said closed end and said passage means, a combustion chamber formed in the closed end of said cylinder member and communicating with said inlet and exhaust passage means, a spark plug having ignition terminals associated with said combustion chamber, and a container for said spark plug, said container being secured in an opening in said cylinder member and extending through an opening in said removable closure means, said container being movable in said opening axially of said spark plug, and a seal disposed between said container and said removable closure means and tending to prevent leakage of cooling liquid through said opening and from said cooling liquid cavity means.

7. An engine having a crankcase member and a cylinder member, said cylinder member having an open end communicating with said crankcase member and a closed end opposite said crankcase member, inlet and exhaust passage means communicating with said cylinder member, valve means in the closed end of said cylinder and controlling said inlet and exhaust passage means, valve actuating means operatively associated with said valve means, a camshaft associated with said crankcase, push rod means extending from said camshaft to said valve actuating means for actuating said valve means, closure means associated with the closed end of said cylinder and supporting said valve actuating means, conduit means containing said push rod means and extending from said crankcase to said closure means, opening means formed in said crankcase and said closure means and receiving the opposite ends of said conduit means, said opening means for said crankcase being formed to provide abutment means tending to limit the movement of said conduit means inwardly of said crankcase, seal means in said opening means and permitting axial movement of said conduit means in said opening means, and means supporting said valve actuating means on said closure means and abutting said conduit means and limiting the movement of said conduit means in said opening means and away from said abutment means.

8. An engine having a crankcase member and a cylinder member, said cylinder member having an open end communicating with said crankcase member and a closed end opposite said crankcase member, inlet and exhaust passage means communicating with said cylinder member, cooling liquid jacket means associated with said members and being formed about and in spaced relation to said cylinder member and said closed end and said inlet and exhaust passage means, said jacket means being open at one side of said cylinder member, and removable closure means closing said jacket means at said one side of said jacket means and providing cooling liquid cavity means in said jacket means and surrounding said cylinder member and said closed end and said passage means, said passage means being formed to extend through said jacket means on the same side of said cylinder member and on opposite sides of said removable closure means.

9. An engine having a crankcase member and a cylinder member, said cylinder member having an open end communicating with said crankcase member and a closed end opposite said crankcase member, inlet and exhaust passage means communicating with said cylinder member, cooling liquid jacket means associated with said members and being formed about and in spaced relation to said cylinder member and said closed end and said inlet and exhaust passage means, said jacket means being open at one end adjacent said closed end of said cylinder member, removable closure means closing said one end of said jacket means and providing cooling liquid cavity means in said jacket means and surrounding said cylinder member and said closed end and said passage means, valve means in said closed end of said cylinder member and controlling said inlet and exhaust passage means, said valve means having valve guide means projecting through said closed end of said cylinder member and said removable closure means, and guide insert means engaging and providing bearing means for said valve stem means and extending through said cylinder member and said closure means and securing said cylinder member and closure means together and sealing said bearing means against leakage of the cooling liquid from said cooling liquid cavity means.

References Cited in the file of this patent
UNITED STATES PATENTS

| 1,972,497 | Smith | Sept. 4, 1934 |
| 2,464,711 | Paxman | Mar. 15, 1949 |
| 2,504,973 | Gehres | Apr. 25, 1950 |
| 2,653,586 | Nallinger | Sept. 29, 1953 |